United States Patent [19]
Donoho et al.

[11] Patent Number: 5,253,444
[45] Date of Patent: Oct. 19, 1993

[54] BIRD REPELLENT APPARATUS FOR WINDOW SILLS AND THE LIKE

[76] Inventors: Bruce A. Donoho, 24362 Via Madrugada, Mission Viejo, Calif. 92692; Richard V. Wells, 28242 San Marcos, Mission Viejo, Calif. 92691

[21] Appl. No.: 937,304

[22] Filed: Aug. 31, 1992

[51] Int. Cl.⁵ ............................................ A01M 29/00
[52] U.S. Cl. ................................................ 43/1; 52/101
[58] Field of Search ................. 43/1, 58; 52/101; 116/22 A

[56] References Cited

U.S. PATENT DOCUMENTS

| | | | |
|---|---|---|---|
| 2,308,893 | 1/1943 | Pavloff | 52/101 |
| 2,456,731 | 12/1948 | Peles | 52/101 |
| 2,475,047 | 7/1949 | Peles | 52/101 |
| 2,887,730 | 5/1959 | Bittner | 52/101 |
| 2,888,716 | 6/1959 | Kaufman | 52/101 |
| 2,938,243 | 5/1960 | Peles | 52/101 |
| 3,191,239 | 6/1965 | Moore | 52/101 |
| 3,282,000 | 11/1966 | Shaw | 52/101 |

FOREIGN PATENT DOCUMENTS

| | | | |
|---|---|---|---|
| 0011525 | 5/1980 | European Pat. Off. | 43/1 |
| 0300936 | 1/1989 | European Pat. Off. | 43/1 |
| 2185173A | 7/1987 | United Kingdom | 43/1 |

*Primary Examiner*—Kurt C. Rowan
*Attorney, Agent, or Firm*—Leonard Tachner

[57] ABSTRACT

A bird repellent apparatus having a base member and a plurality of top members, each of which holds a plurality of prongs. The base member, by means of a plurality of tabs having holes for receiving screws or other fasteners, can be affixed to virtually any desired surface with little or no risk of injury to the installer. The top member comprises a prong holder, each having a plurality of prongs with sharp tips presenting an impossible barrier to birds that would otherwise land or perch on the surface to which the present invention is affixed. The top members are adapted to be press fit onto the base member after the base member has been installed on the underlying surface. In an alternative embodiment, the base member is an extruded plastic structure that provides countersunk holes to secure the base member to the underlying surface without the need for tabs.

1 Claim, 3 Drawing Sheets

BIRD REPELLENT APPARATUS FOR WINDOW SILLS AND THE LIKE

BACKGROUND OF THE INVENTION

1. Field of the Invention

The present invention relates generally to devices for preventing birds from landing or perching on selected surfaces, and more specifically to a bird repellent apparatus that comprises a base member and a pronged top member preferably made out of injection molded plastic components for simple and low cost manufacture and easy installation on virtually any surface to which access to birds is to be denied.

2. Prior Art

The presence of birds on window sills, roof tops, boat masts and covers and the like is often undesirable. Bird droppings attract insects and provide a fertile bed for bacteria which can present a significant health hazard. Additionally, the unaesthetic appearance of bird droppings and the like often requires the task of unpleasant and time consuming clean up where access to the droppings is available. Often times the repulsive appearance of bird droppings and other by products of birds is not even accessible for clean up.

The use of a plurality of pointed objects, such as spikes and the like, mounted on surfaces where it is desired to repel birds is not unknown. However, heretofore the typical bird repellent apparatus comprises a metal base having a plurality of angularly and upwardly projecting metal wires or spikes. Unfortunately, such metal contraptions, while accomplishing the desired result, tend to be costly to manufacture because they are not conducive to non-labor intensive manufacturing processes such as injection molding for example. They also tend to be difficult to install and occasionally dangerous to install because the angularly extending wires or spikes are permanently attached to the base member, making them hazardous to the installer. Perhaps most importantly, they tend to be relatively expensive, which inherently limit their use.

There is a need therefore for a bird repellent apparatus which is easy and less costly to manufacture, which can be readily installed without any danger to the installer and which is relatively inexpensive to the user, thereby facilitating its use in larger numbers for avoiding the aforementioned problems of insect and bacteria infestation and unaesthetic appearance of the droppings and other waste products birds leave in their wake.

SUMMARY OF THE INVENTION

The aforementioned need is satisfied by the present invention which provide significant advantages over the aforementioned prior art. More specifically, the present invention comprises a bird repellent apparatus having a base member and a plurality of top members, each of which holds a plurality of prongs. All of the components of the present invention are preferably made of an injection molded plastic which can be cheaply manufactured in large numbers with virtually no significant labor costs. The base member, by means of a plurality of tabs having holes for receiving screws or other fasteners, can be affixed to virtually any desired surface with little or no risk of injury to the installer. The top member comprises a prong holder, each having a plurality of prongs with sharp tips presenting an impossible barrier to birds that would otherwise land or perch on the surface to which the present invention is affixed. The top members are adapted to be press fit onto the base member after the base member has been installed on the underlying surface, thereby obviating the aforementioned risk of injury to the installer during installation of the base member. The use of injection molded plastics not only reduces the cost of manufacture and thus the cost to the user, but also provides the opportunity to manufacture the product in a variety of different colors, some of which may be selected to blend in with the color of the underlying surface and some of which may be purposely selected to provide an aesthetically pleasing and distinctive appearance. In either case, it can be seen that the present invention provides an efficient and effective apparatus for repelling birds from surfaces such as window sills, roof tops, boat masts and boat covers and the like, while overcoming the previously described disadvantages of the prior art.

OBJECTS OF THE INVENTION

It is therefore a principal object of the present invention to provide a bird repellent apparatus for installation on selected surfaces for preventing birds from landing or perching thereon and which overcomes the disadvantages of the prior art.

It is an additional object of the present invention to provide a bird repellent apparatus made entirely of low cost plastic made by injection molding and/or extrusion.

It is still an additional object of the present invention to provide a bird repellent apparatus of the type having a plurality of sharp-tipped prongs to prevent birds from landing or perching upon selected surfaces, the apparatus having a separate base member and prong holding members to enable simple and safe installation.

It is still an additional object of the present invention to provide a bird repellent apparatus comprising an injection molded or extruded plastic base member and a plurality of injection molded plastic top members, each such top member having a prong holder and a plurality of sharp-tipped prongs, the top members being adapted for being press fit onto the base member after installation of the base member.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
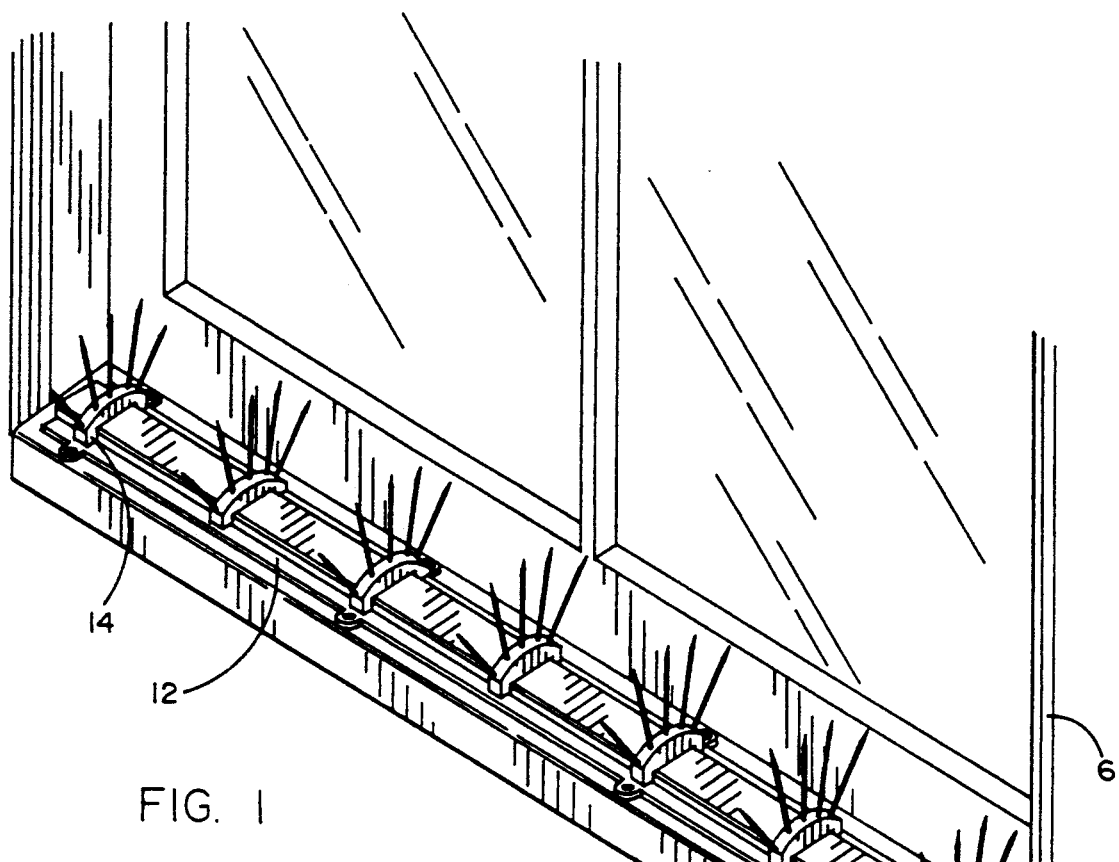
FIG. 1 is a three-dimensional illustration of a typical installation of the present invention on an exterior window sill adjacent a window frame.
Figure 2:
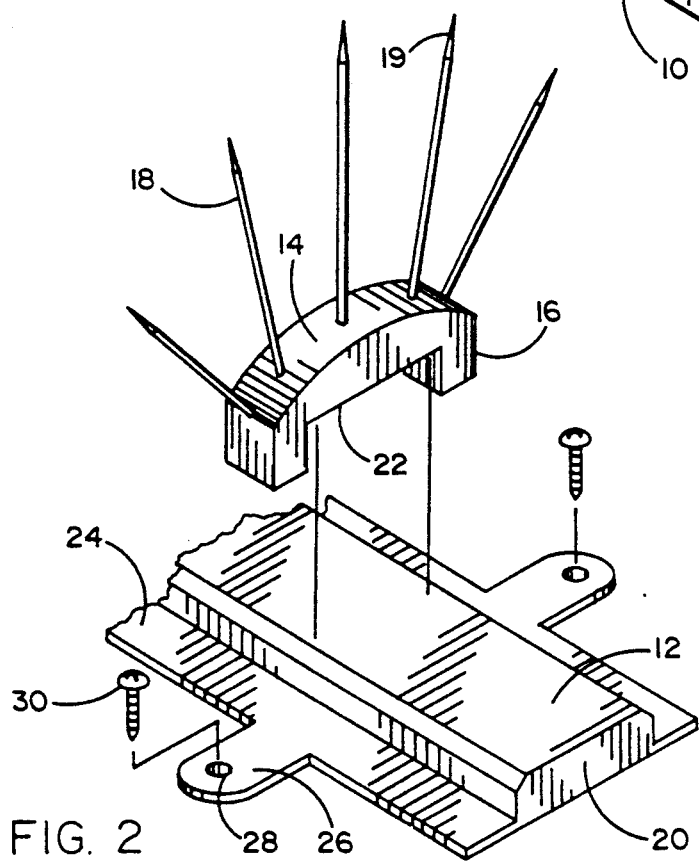
FIG. 2 is an exploded, partial view of a bird repellent apparatus in accordance with the present invention showing the components thereof.

Referring to FIG. 1, it will be seen that the bird repellent apparatus 10 of the present invention is shown mounted on a window sill 5 of an adjacent window frame 6. As seen further in FIG. 1, as well as in FIG. 2, the apparatus 10 comprises a base member 12 and a plurality of top members 14, each such top member comprising a prong holder 16 and a plurality of prongs 18. Each such prong terminates in a sharp tip 19. The base member 12 provides a rail 20 from which extends integrally therefrom a pair of flanges 24 along the full length of base member 12. The flanges 24 each have a plurality of caps 26 extending in opposed directions away from the rail 20. Each such tab is provided with a hole 28 which is adapted to receive a screw 30 for connecting the base member 12 to the underlying surface such as window sill 5.

The prong holder 16 of the top member 14 is provided with a bridge 22, the dimensions of which provide for a press fit engagement between the top member 14 and the rail 20 of base member 12.

Figure 3:
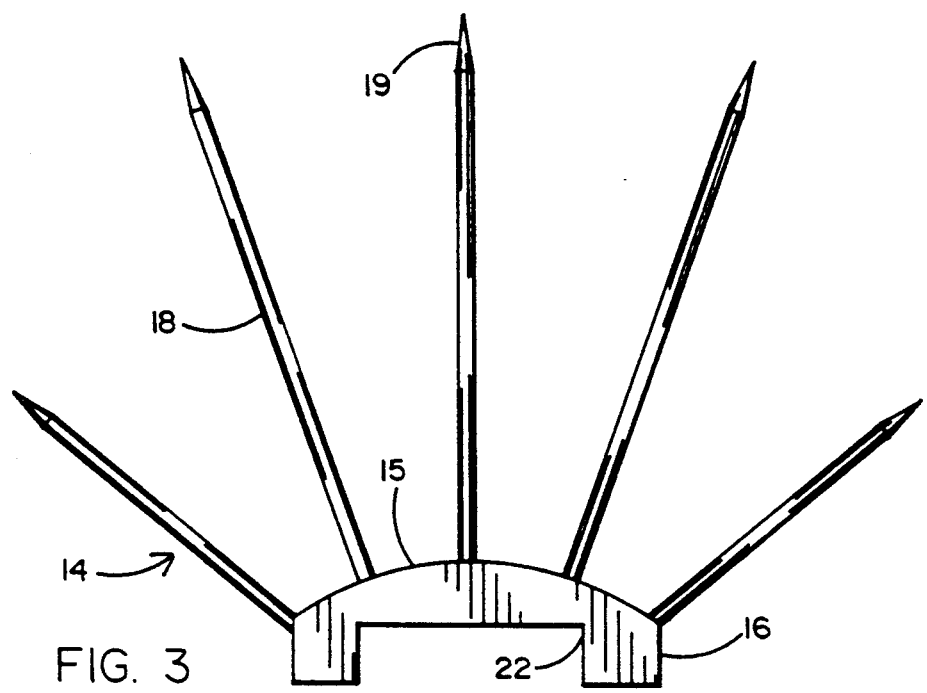
FIG. 3 is a plan view of the top member of the present invention.
Figure 4:
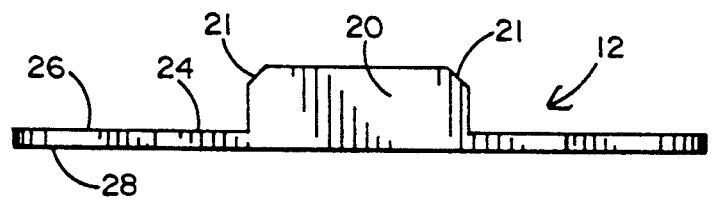
FIG. 4 is a side view of the base member of the present invention.

The detailed structure of the top members 14 and the base member 12 may be better understood by referring to FIGS. 3 and 4. In FIG. 3 it will be seen that the prong holder 16 is provided with five prongs 18, all of which terminate in a tapered, sharpened tip 19 of conical configuration. It will be understood that the exact shape of each such prong 18 is a matter of choice, and in fact in an alternative embodiment shown in FIG. 5, each prong 23 is tapered from its base to its tip as opposed to a circular cylinder and a cone as shown for prongs 18 in FIG. 3. In any event, one such prong is positioned at the center of the upper surface 15 of the prong holder and the other four are spaced at angles of approximately 20 degrees and 40 degrees, respectively, with respect to the center prong. In the preferred embodiment herein, the three center prongs are about three inches long and the two remaining prongs are about two inches long. The maximum dimension across the bridge 22 is 1.25 inches and the distance between the outer edges of the prong holder 16 is two inches. As seen best in FIG. 4, the base member 12 has a relatively symmetrical configuration with rail 20 located at the center and flanges 24 of equal width extending therefrom in opposite directions. The overall width of the rail 20 is, in the preferred embodiment, 1.26 inches, in order to provide a compression fit between the bridge 22 and the rail 20. For this purpose, the rail 20 is provided with chamferred corners 21 which facilitates the interconnection of the prong holder 16 with the base member 12. The overall length between the extremities of the flanges 24 is two inches, while the overall length between the outer extremities of the tabs 26 is three inches. The overall length of the base member 12 measured axially, for example along the length of window sill 5 of FIG. 1, is in the embodiment illustrated herein, 20 inches and the spacing between tabs 26 is approximately 6 inches. However, it will be understood that the overall length of each of the components herein, including the base member 12, may be readily varied depending upon the application. It will also be understood that the number of top members 14 press fit onto the base member 12 and the distance between such top members may be varied depending upon the application. It will also be understood that the base member 12 need not be a planar member. By way of example, a circular shaped base member may be provided, for example where the underlying surface to be protected by the repellent apparatus 10 of the present invention is of a circular configuration.

Installation of the present invention may be readily accomplished by first placing the base member 12 on the surface to be protected and inserting a plurality of screws 30 through holes 28 to secure the base member to the underlying surface. Then after the base member has been installed, a plurality of top members 14 may be readily connected to the base member by simply press fitting each prong holder to the base member at selected spaced intervals, which for example, the configuration shown in FIG. 1 provides a simple illustration. The base member 12 and each of the top members 14 may be readily manufactured by plastic injection molding processes. In the preferred embodiment hereof, the top members are fabricated with the prongs integrally connected thereto, thereby obviating any additional labor requirement for otherwise connecting prongs to the top members.

Figure 5:
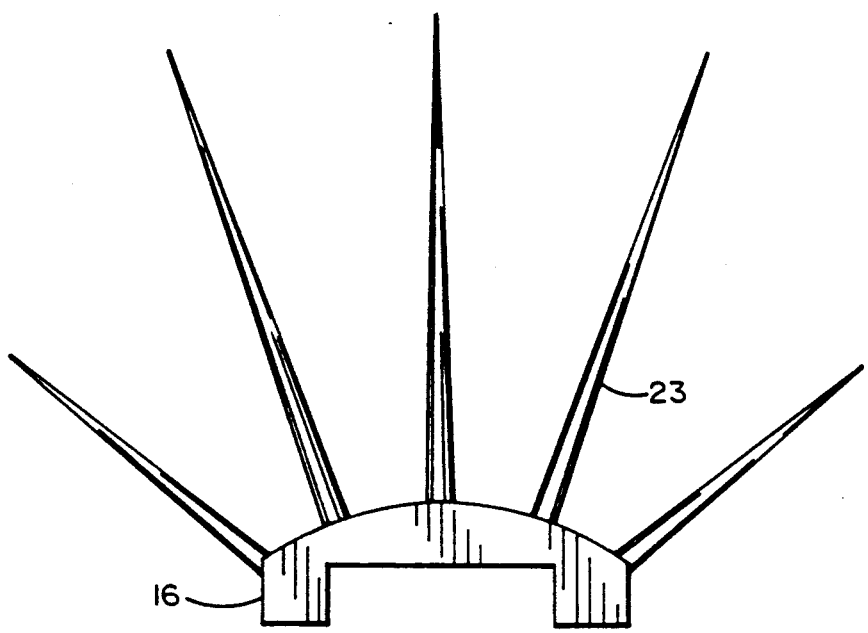
FIG. 5 is a partial plan view of an alternative embodiment of a top member having prongs tapered over their entire length.
Figure 7:
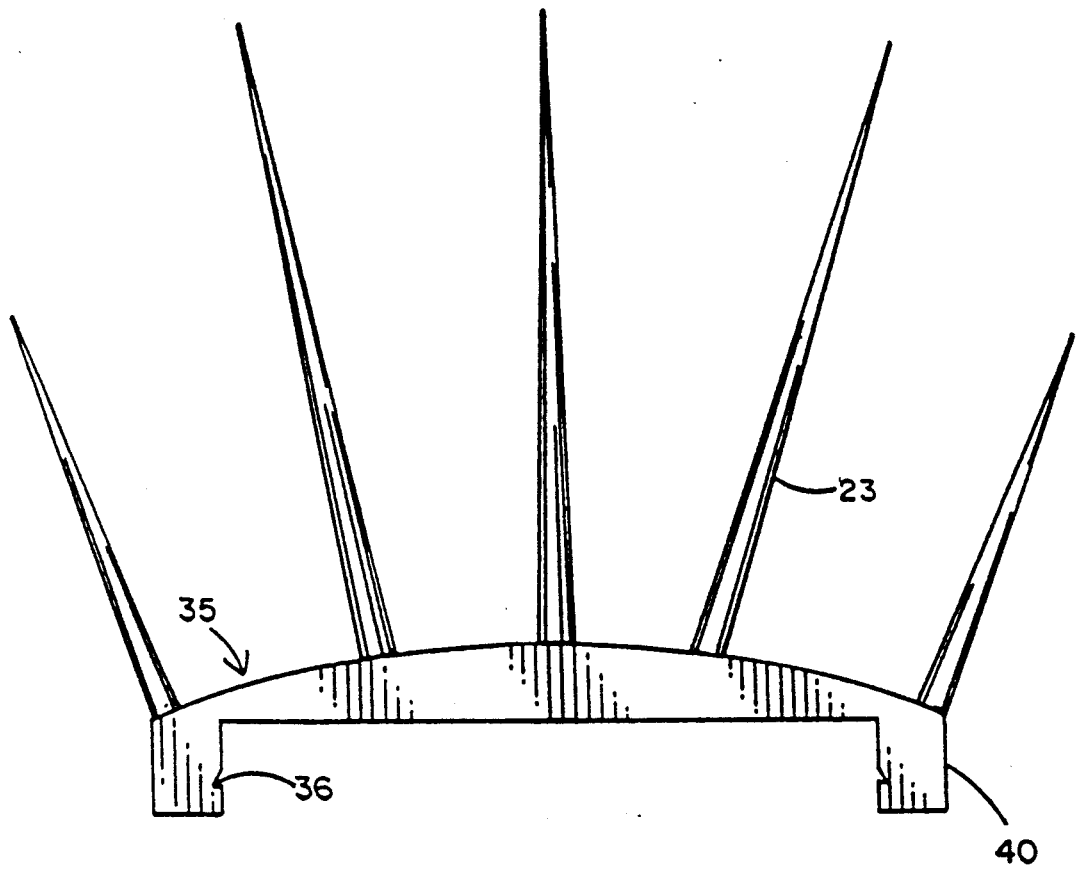
FIG. 7 is a plan view of a top member suitable for use with the base member of FIG. 6.
Figure 6:
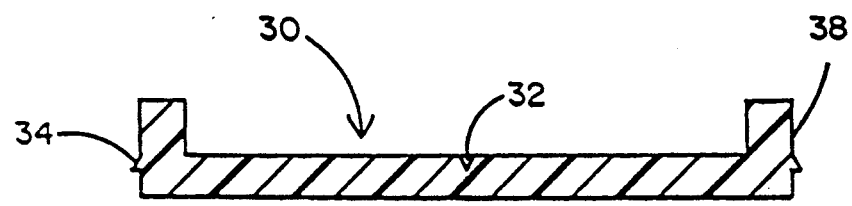
FIG. 6 is a cross-sectional view of a base member of an alternative embodiment.

Another embodiment of the invention is illustrated in FIGS. 6 and 7. In this embodiment, a base member 30 of generally rectangular C-shaped cross-section is configured for fabrication by means of plastic extrusion. Periodically located countersunk holes 32 permit installation of the base member on an underlying surface. An elongated undercut ridge 34 on each of opposing side members 38 cooperates with triangular recesses 36 in alternative top member 35 to secure the top members to the base member. The prongs 23 are the same as shown in FIG. 5. The top member 35 has a C-shaped bottom surface including side flanges 40 separated for extending over the expanse of the side members 38.

It will now be understood that what has been disclosed herein comprises a novel bird repellent apparatus comprising a base member and a plurality of top members, each such top member proving a prong holder and a plurality of prongs extending from an upper surface of the top member at various angles, each such prong having an elongated configuration terminating in a pointed tip. One embodiment of the base member is provided with a pair of laterally opposed and extending flanges, each such flange providing a number of tabs having a hole for receiving a screw or other fastener for connecting the base member to an underlying surface to be protected, such as a window sill, roof top, boat mast and the like. The top members are each provided with a bridge which is designed in shape and dimension to be press fit onto a rail in the base member without requiring any additional fastening elements. Consequently the base member may be readily installed before any of the top members are press fit onto the base member, thereby facilitating installation of the base member without any risk of injury from inadvertent contact with the prong tips. A second embodiment of the base member that may be fabricated by a low cost plastic extrusion process, provides countersunk holes for attachment to the underlying surface and an elongated undercut ridge for top member attachment.

Those having skill in the art to which the present invention pertains, will now as a result of the applicants' teaching herein, perceive various modifications and additions which may be made to the invention. By way of example, the specific materials, dimensions, and shapes disclosed herein may be readily altered without deviating from the basic teaching of the invention. Accordingly, all such modifications and additions are deemed to be within the scope of the invention which is to be limited only by the claims appended hereto and their equivalents.

We claim:

1. A bird repellent apparatus comprising:

a base member of elongated generally rectangular C-shaped cross-section terminating in opposing side members having elongated oppositely facing ridges at least one said ridge extending along the outer surface of each of said side members;

at least one top member having a top surface from which a plurality of point-tipped prongs extend for repelling birds, and having a bottom surface of C-shaped configuration including side flanges separated for extending over the expanse of said side members; the inner surface of each of said side flanges being in contiguous engagement with the respective outer surfaces of said side members; said inner surfaces of said side flanges of said top member having elongated recesses for receiving said oppositely facing ridges of said side members of said base member for locking said base member to each said top member.

* * * * *